United States Patent
Gardrat et al.

(10) Patent No.: US 12,406,299 B2
(45) Date of Patent: Sep. 2, 2025

(54) SYSTEM AND METHOD FOR LOW LATENCY MULTI-MARKET ORDER BOOK CONSOLIDATION

(71) Applicant: NovaSparks, Inc., New York, NY (US)

(72) Inventors: Pierre Gardrat, Paris (FR); Elena Pugliese, Gentilly (FR); Guillaume Taba, Saint Selve (FR); Julien Girard, Saint Sebastien sur Loire (FR); Camille Ribet, Rezé (FR); Fei Li, Paris (FR); Jonathan Clairembault, Vannes (FR); Daniel Strul, Paris (FR)

(73) Assignee: NovaSparks, Inc., New York, NY (US)

( * ) Notice: Subject to any disclaimer, the term of this patent is extended or adjusted under 35 U.S.C. 154(b) by 106 days.

(21) Appl. No.: 17/220,205

(22) Filed: Apr. 1, 2021

(65) Prior Publication Data

US 2021/0312550 A1 Oct. 7, 2021

Related U.S. Application Data

(60) Provisional application No. 63/004,432, filed on Apr. 2, 2020.

(51) Int. Cl.
*G06Q 40/04* (2012.01)
*G06Q 30/0201* (2023.01)

(52) U.S. Cl.
CPC ......... *G06Q 40/04* (2013.01); *G06Q 30/0201* (2013.01)

(58) Field of Classification Search
None
See application file for complete search history.

(56) References Cited

U.S. PATENT DOCUMENTS 6,278,982 B1 8/2001 Korhammer et al.
8,326,736 B2 12/2012 Wunsch et al.
(Continued)

FOREIGN PATENT DOCUMENTS

CN 107872369 A 4/2018

OTHER PUBLICATIONS

International Search Report and Written Opinion mailed Jul. 30, 2019 in connection with International Application No. PCT/US2019/027626.
(Continued)

*Primary Examiner* — Matthew S Gart
*Assistant Examiner* — Liz P Nguyen
(74) *Attorney, Agent, or Firm* — Wolf, Greenfield & Sacks, P.C.

(57) ABSTRACT

The present disclosure provides techniques and associated systems for low-latency integrated circuit-based feed handler circuits and multi-market order book consolidator circuits. In some embodiments, integrated circuit-based feed handler circuits described herein can be configured to store aggregate quantities of instruments and/or determine round-lot price levels in a parallel hardware configuration. In some embodiments, integrated circuit-based order book consolidator circuits described herein can be configured to determine consolidated prices across multiple market data feeds and/or for different groups of markets in parallel hardware configurations. According to various embodiments, aspects of the present disclosure can be implemented using one or more FPGAs, ASICs, and/or combinations thereof.

19 Claims, 8 Drawing Sheets

(56) References Cited

U.S. PATENT DOCUMENTS

| | | |
|---|---|---|
| 9,443,269 B2 | 9/2016 | Battyani |
| 9,582,831 B2 | 2/2017 | Parsons et al. |
| 9,904,931 B2 | 2/2018 | Battyani |
| 10,062,115 B2 | 8/2018 | Taylor et al. |
| 10,269,072 B2 | 4/2019 | Faier |
| 10,346,918 B2 | 7/2019 | Schmitt et al. |
| 2009/0063360 A1* | 3/2009 | Callaway ............ G06F 16/9535 705/36 R |
| 2009/0209759 A1* | 8/2009 | Warrington ............ G16C 20/50 544/405 |
| 2012/0209759 A1* | 8/2012 | Singer .................... G06Q 20/10 705/37 |
| 2013/0226764 A1* | 8/2013 | Battyani ................ G06Q 40/04 705/37 |
| 2016/0337252 A1 | 11/2016 | Eberle et al. |
| 2017/0103457 A1* | 4/2017 | Acuña-Rohter et al. .................... G06Q 40/04 |
| 2018/0121103 A1 | 5/2018 | Kavanagh et al. |
| 2019/0095994 A1* | 3/2019 | Rooney ............... H04L 43/0858 |
| 2019/0319887 A1 | 10/2019 | Gardrat et al. |

OTHER PUBLICATIONS

International Preliminary Report on Patentability mailed Oct. 29, 2020 in connection with International Application No. PCT/US2019/027626.

* cited by examiner

SYSTEM AND METHOD FOR LOW LATENCY MULTI-MARKET ORDER BOOK CONSOLIDATION

CROSS-REFERENCE TO RELATED APPLICATIONS

This application claims the benefit under 35 U.S.C. § 119(e) of U.S. Provisional Application Ser. No. 63/004,432, filed Apr. 2, 2020, and entitled "SYSTEM AND METHOD FOR LOW LATENCY MULTI-MARKET ORDER BOOK CONSOLIDATION," which is incorporated herein by reference in its entirety.

BACKGROUND

Markets provide market information to participants, such as banks, brokers trading firms, and/or others through electronic market data feeds. The market data information typically includes information that participants rely on to interact with the market, such as information about buy or sell orders sent by the participants to the market, details about trades executed by the market, and/or the status of various financial instruments in the market. Trade details may include the prices and/or quantities involved in each executed trade, such as for instance when the market matches a sell order with a buy order. Instrument statuses may include an indication of whether a particular financial instrument can be traded at a given moment in time.

When providing market information to participants, market data feeds are often tasked with delivering a high volume of data and may be subject to data bursts. During a data burst, a market data feed may need to deliver data at a rate substantially higher than the average rate at which the feed typically operates. For example, a burst data rate may be up to 4 times greater than the average data rate. Moreover, market data typically needs to be processed with minimal delay, such as on the order of nanoseconds, in order to be useful for participants. For example, in high frequency trading, a participant may want to perform several trades per second, and excessive delay may cause the data the participant needs to perform the trades to no longer be accurate upon reaching the participant.

Markets typically provide messages using User Datagram Protocol ("UDP") on Ethernet networks and encode market data information in their own data format.

One or more market data feed handlers may be implemented to streamline the distribution of market data to participants. A market data feed handler may include a processing system configured to consolidate market information from one or more markets, and/or pertaining to a particular group of financial instruments, into a stream of messages to be sent to participants. Feed handlers can normalize the stream of market data to participants by converting it from the market-specific data formats in which it is supplied by the feeds to a normalized format to be provided to participants. Feed handlers can be co-located with the markets, such as in a same data-center, in which case they can be directly connected to the locally-generated market data feeds by ethernet cables. Feed handlers can alternatively or additionally receive market data from remotely-generated market data feeds via cables and/or wireless radio infrastructure.

While some feed handlers output, in messages to participants, individual buy or sell orders for various financial instruments, more advanced feed handlers can build order books of buy or sell orders for each financial instrument and instead output updates to order books that are stored on the participant end. An order book for a particular financial instrument typically includes a dual-sorted list of levels, with one side for ask prices and one side for bid prices. The ask price of a financial instrument may be the price requested by a seller of the instrument, and the bid price may be the price offered by a buyer of the instrument. Each level of the order book typically corresponds to a price, and the level can specify a quantity at that price as well as a number of orders at that price, so as to aggregate multiple orders of the instrument on a same side when the orders share a same price. The levels on the ask side of the order book may start from the lowest price at level 1 and increase in price by level, as higher ask prices may be less useful to a prospective buyer of the instrument. Likewise, the levels on the bid side of the order book may start from the highest price at level 1 and decrease in price by level, as lower bid prices may be less useful to a prospective seller of the instrument.

The information stored in the levels of the order book may be obtained directly from market updates, or alternatively may be built from a list of active orders for each financial instrument. On the participant end, a participant may choose to include only the first level of an order book. For example, the first level may list the highest bid price and/or the lowest ask price, which may be the most useful information to the participant. In such a case, the feed handler may be configured for Level 1 (L1) publication, also called "Best Bid Offer" (BBO) publication. Alternatively, a participant may prefer more levels on each side such as 5 or 10 levels. For example, the feed handler may be configured for Level 2 (L2) publication.

Feed handlers may be implemented in software or in hardware, such as by using one or more field programmable gate arrays (FPGAs). FPGA-based feed handlers offer a desirable low-latency profile for processing the market data stream. FPGA-based feed handlers also reduce the overall latency between the market and participants. In some instances, multiple market data feeds can be processed by multiple FPGAs within a matrix of FPGAs.

Feed handlers can be implemented in software, by using programming code running on one or multiple processing units (or CPUs) or in hardware, by using FPGAs or any other integrated circuit. FPGA-based feed handlers offer a much better latency profile to process the market data stream—and can thus be referred to as "low latency feed handlers". FPGA-based feed handlers will reduce the overall latency between the market and the participants. Also, multiple market feeds can be implemented by multiple FPGAs in a matrix of FPGAs.

BRIEF SUMMARY

Some aspects of the present disclosure relate to a device comprising a plurality of digital logic gates configured to receive market data for a first instrument from a plurality of market data feeds and output consolidated market data for the first instrument.

In some embodiments, the plurality of digital logic gates comprises a first comparator circuit configured to receive the market data for the first instrument from a first plurality of market data feeds and output first consolidated market data for the first instrument.

In some embodiments, the first comparator circuit comprises a first comparator tree comprising a plurality of comparators each configured to receive price data for the first instrument from the first plurality of market data feeds.

In some embodiments, the plurality of digital logic gates further comprises a second comparator circuit configured to receive the market data for the first instrument from a subset of the first plurality of market data feeds and output second consolidated market data for the first instrument and an output circuit configured to generate and output update messages comprising the first and second consolidated market output data for the first instrument.

In some embodiments, the market data for the first instrument from the first plurality of market data feeds comprises a first price, a first quantity, and/or a first status of the first instrument.

In some embodiments, the device further comprises a memory configured to store first configuration parameters for the first comparator circuit and second configuration parameters for the second comparator circuit, the first comparator circuit is configured to receive the market data for the first instrument from the first plurality of market data feeds based on the first configuration parameters stored in the memory, and the second comparator circuit is configured to receive the market data for the first instrument from the subset of the first plurality of market data feeds based on the second configuration parameters stored in the memory.

In some embodiments, the memory is further configured to receive an update to the second configuration parameters and store updated second configuration parameters and the second comparator circuit is further configured to receive market data for the first instrument from a second subset of the first plurality of market data feeds based on the updated second configuration parameters.

In some embodiments, the device further comprises lookup circuitry configured to receive the market data for the first instrument, map the received market data to the first instrument, and provide the market data to the first comparator circuit.

Some aspects of the present disclosure relate to a device comprising a plurality of digital logic gates configured to receive market data for a first instrument from a first market data feed and output a first subset of the received market data having at least a first predetermined aggregate quantity.

In some embodiments, the plurality of digital logic gates comprises a first comparator circuit configured to receive the market data for the first instrument from the first market data feed and compare an aggregated quantity of the first instrument, generated based on the received market data, to the first predetermined aggregated quantity to generate the first subset.

Some aspects of the present disclosure relate to a system comprising a first integrated circuit configured to receive market data for a first instrument from a first market data feed and output a first subset of the received market data having at least a first predetermined aggregate quantity, a second integrated circuit configured to receive market data for the first instrument from a second market data feed and output a second subset of the received market data having at least a second predetermined aggregate quantity, and a third integrated circuit configured to receive the first subset and the second subset from the first and second integrated circuits; and compare the first subset to the second subset to generate consolidated market data for the first instrument.

In some embodiments, the first subset comprises a first price, a first quantity, and/or a first status of the first instrument and the second subset comprises a second price, a second quantity, and/or a second status of the first instrument.

In some embodiments, the first integrated circuit comprises a first comparator circuit configured to receive the market data for the first instrument from the first market data feed; and compare an aggregated quantity of the first instrument, generated based on the received market data, to the first predetermined aggregated quantity to generate the first subset.

In some embodiments, the first integrated circuit further comprises a memory configured to store a plurality of sorted price levels of the market data with aggregated quantities of each price level and the first comparator circuit comprises a plurality of comparators each configured to compare an aggregated quantity of a respective one of the plurality of sorted levels to the first predetermined aggregated quantity.

In some embodiments, the first integrated circuit is further configured to calculate the aggregated quantity of each of the plurality of sorted levels as a sum of either a quantity of the sorted level combined with quantities of each sorted level having a higher price than the sorted level or a quantity of the sorted level combined with quantities of each sorted level having a lower price than the sorted level.

In some embodiments, the third integrated circuit comprises a first comparator circuit configured to receive at least the first subset and output first consolidated market data for the first instrument.

In some embodiments, the first comparator circuit comprises a first comparator tree comprising a plurality of comparators, each of the plurality of comparators being configured to receive price data for the first instrument from a first plurality of market data feeds that comprises the first market data feed.

In some embodiments, the third integrated circuit further comprises a second comparator circuit configured to receive at least the second subset and output second consolidated market data for the first instrument and an output circuit configured to generate and output update messages comprising the first and second consolidated market output data for the first instrument.

In some embodiments, the third integrated circuit further comprises a memory configured to store first configuration parameters for the first comparator circuit and second configuration parameters for the second comparator circuit, the first comparator circuit is configured to receive the first subset based on the first configuration parameters stored in the memory, and the second comparator circuit is configured to receive the second subset based on the second configuration parameters stored in the memory.

In some embodiments, the third integrated circuit further comprises lookup circuitry configured to receive the first and second subsets, map the first and second subsets to the first instrument, and provide the first and second subsets to the first comparator circuit.

The foregoing summary is not intended to be limiting. In addition, aspects described herein can be implemented alone or in combination with other aspects described herein, according to various embodiments.

DETAILED DESCRIPTION

Figure 1:
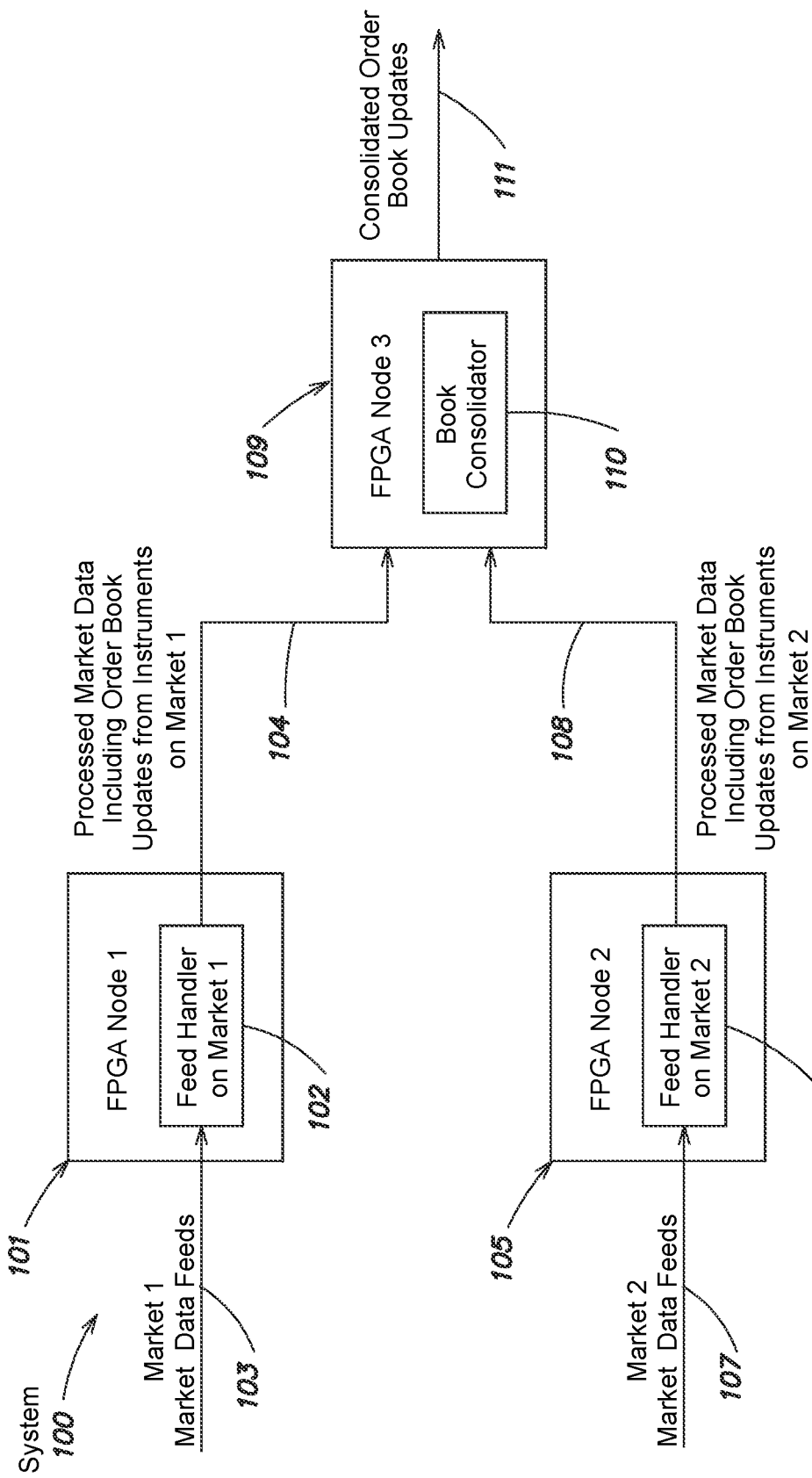
FIG. 1 is a block diagram of an exemplary system for multi-market order book consolidation, according to some embodiments.

Some financial instruments can be traded on multiple markets at the same time, such as equities, which are regulated financial instruments that can be traded across several markets. For example, United States equities can be traded on more than sixteen different equity markets within the United States, as can United States equity options. Similarly, Canadian equities can be traded on at least ten markets in Canada, and European equities can be traded on several markets spread around the European Union. While participants could trade only on one particular market, participants frequently trade on several markets, as the different markets offer different prices and more opportunities to trade. Moreover, in some jurisdictions, a participant trading on behalf of a third party (e.g., a client) can be legally obligated to review prices on a particular list of markets and disclose the best prices across the list of markets (e.g., the lowest ask price and/or highest bid price) to the third party. In the United States, for example, the Securities and Exchange Commission (SEC) requires participants trading on behalf of a third party to review the national best-bid-offer (NBBO) prices for an instrument before placing orders for the instrument.

Accordingly, multi-market order book consolidation systems can be used to consolidate market data from multiple markets into a single feed for participant consumption. One currently available tool for participants to obtain NBBO prices for one or more instruments is the Securities Information Processor (SIP), employed by the SEC, which receives a special version of each market's dedicated feed and consolidates prices from the list of NBBO markets into a single feed. Another available tool for participants is a multi-market order book consolidation system that receives the BBO price of one or more instruments from each market's dedicated feed, calculates the NBBO prices using the BBO prices received from the dedicated feeds, and outputs the results in a single feed.

Currently available multi-market order book consolidation systems have been developed in response to certain inadequacies of the SIP. For example, the SIP is generated at a couple of fixed locations that can cause latency issues for participants who are far from those locations, and the SIP can also have latency issues tied to its particular consolidation architecture. Also, participants may want to receive more levels than the SIP is configured to publish. In addition, some jurisdictions don't have their own SIP-equivalent consolidation system for compliance with local regulations. Typically, a multi-market order book consolidation system can include multiple feed handlers set up to receive dedicated market feeds and provide market data to a consolidator, which generates a dual-sorted list of aggregated price levels for an instrument across the markets, each level including a cumulative quantity and market-specific quantity of the instrument.

In some cases, a multi-market order book consolidator can aggregate all levels listed in the order books of an instrument regardless of the quantity listed at each level. In other cases, such as for U.S. or Canadian regulatory purposes, it can be desirable for the multi-market order book consolidator to consolidate only order book levels for an instrument having at least a minimum quantity. For example, participants typically place orders based on the received order book levels, and it may be desirable for the participants to only place orders involving at least a certain minimum quantity of the instrument so as to minimize the number of low-quantity orders placed for enhanced market efficiency. The minimum quantity for consolidation is often referred to as the "lot size" or "board lot" and is defined specifically for each instrument, and a quantity that is greater than or equal to the "lot size" is often referred to as a "round lot" quantity. Order book levels having at least the minimum quantity of the instrument are often referred to as "round-lot levels," and order books containing only round-lot levels are often referred to as "round-lot order books." To allow for consolidation of only round-lot levels, feed handlers that receive each market feed and may need to provide to the consolidator only order book updates having at least a round-lot quantity.

The inventors have recognized several problems of currently available multi-market order consolidation systems. One problem is that such systems do not provide consolidated market data feeds to participants with low enough latency for participants to consume the market data feeds while the market data is still useful. For example, the SIP can provide NBBO prices in only a few locations and can introduce significant delays between dedicated market feeds and participants, which can cause the NBBO prices to no longer be useful once they reach the participants (e.g., during a burst event). On the other hand, multi-market order book consolidation systems that seek to provide a low-latency alternative to the SIP do not receive round-lot levels of order books from special market feeds the way the SIP does. Thus, in order for such consolidation systems to provide round-lot level order book updates in the manner the SIP does, these consolidation systems would have to calculate round-lot quantities in real-time, which would add significant delays to publication of order book updates, similarly causing prices to no longer be useful once they reach participants.

The inventors also recognized that the latency of currently available order book consolidation systems is impaired by their implementation as software executed on general purpose processors, which operate on data sequentially. For instance, currently available order book consolidators executed by a general purpose processor can receive and sequentially process order book updates from market-specific feed handlers for many instruments over many markets. Since general purpose processors operate on data sequentially, data usually waits in a queue until the processor can operate on it, which can create substantial delays in processing when the data reaches a high enough volume, as in the case of market data from multiple markets. In one example, a multi-market consolidator for U.S. equities can receive market data for around 10,000 instruments on around sixteen markets. While each market specific feed uses a fairly small amount of data bandwidth when considered on average over a long period of time (e.g., minutes), such as under 100 megabits per seconds (Mb/s), such feeds can exhibit extremely high burst data bandwidth profiles when considered over shorter periods of time (e.g., under a millisecond), such as on the order of 1 Gigabit per second (Gb/s). High data bursts can be even more substantial during times of high market volatility, and the bursts can increase the bandwidth of multiple market data feeds at the same time due to commercial interaction among the various markets.

When a high data burst occurs, it can take a substantial amount of time for an order book consolidator implemented in software to decode and compare the received market data to data from other markets in order to calculate BBO prices. For example, since the software is executed on a general purpose processor, market data waiting to be decoded and compared sits in a queue, which creates large queuing delays during the data burst. Such delays can cause downstream participants to act on stale data, which can lead to participants placing orders for instruments at quantities that are no longer available or at prices that are no longer the best prices. Accordingly, software-implemented order book consolidation systems are impaired with poor latency that makes them unsuitable for high-frequency trading.

Another problem of currently available order book consolidation systems is that they are not flexible enough to provide participant-specific consolidated market data feeds, nor capable of such flexibility with sufficiently low latency. Typically, participants need more information (e.g., more order book levels) than the SIP provides, which requires the participants to look at other consolidated market data feeds in addition to the SIP. For instance, in addition to any order book updates required by regulation, participants may want to receive order book updates for only a desired subset of markets for a particular instrument. The best prices of a user's selected subset of markets are often referred to as User Best-Bid-Offer (UBBO) prices. In one example, a participant trading United States equities may be required by regulation to receive United States-specific NBBO prices, such as including BBO prices among the New York Stock Exchange (NYSE), NYSE Arca, NYSE American, NYSE Chicago, INET, NASDAQ BX, NASDAQ PSX, Chicago Board Options Exchange (CBOE) BZX, CBOE BYX, EDGA, EDGX, Investors' Exchange (IEX) and/or others. In this example, the participant may be interested in also receiving UBBO prices only among markets of the "New Jersey Triangle," such as NYSE, NYSE Arca, INET, NASDAQ BX, NASDAQ PSX, CBOE BZX, CBOE BYX, EDGA, and EDGX. Currently available order book consolidation systems are not capable of providing NBBO and UBBO prices to participants in a single consolidated feed with low latency.

To address the flexibility and latency issues of currently available multi-market order book consolidation systems, the inventors developed improved systems and methods employing integrated circuits configured to provide multi-market consolidated feeds to participants in a flexible manner and with low latency. In some embodiments, integrated circuits described herein can include digital logic gates configured to receive market data for a first instrument from multiple market data feeds and output consolidated market data for the first instrument (e.g., in a feed accessible to participants). The inventors recognized that integrated circuits with digital logic gates can be configured to receive and consolidate market data with lower latency than software executed on a general purpose processor. In some embodiments, integrated circuits described herein can include one or more FPGAs, application-specific integrated circuits (ASICs), and/or combinations thereof (e.g., having a mix of programmable and non-programmable digital logic dates).

In some embodiments, integrated circuits described herein can be configured to output market data updates with a latency of less than five microseconds, such as less than one microsecond, (e.g., with a tolerance of 0.01%, 0.02%, 0.03%, 0.04%, or 0.05%), even during high data burst events.

In some embodiments, integrated circuits described herein overcome the latency issues of software-implemented order book consolidators using parallel hardware configurations, which address the queuing constraints of sequentially-operated general purpose processors. In one example, an integrated circuit can include a first comparator circuit configured to receive and consolidate market data for a first instrument from a first group of market data feeds and a second comparator circuit configured to receive and consolidate market data for the first instrument from a second group of market data feeds. Software executed on a general purpose processor can only process data for different groups of market data feeds sequentially, with the data of one group waiting in a queue while data of the other group is processed. In contrast, in this example, two comparator circuits can be configured to receive and process market data, which allows the market data to be processed in parallel, thereby removing the need for queuing to hold market data for different groups of market data feeds.

In some embodiments, integrated circuits described herein can, alternatively or additionally, overcome latency issues of software-implemented market-specific feed handlers. In one example, a first integrated circuit can be configured to receive market data for a first instrument from a first market data feed and output a first subset of the received market data (e.g., round-lot levels for the first market), and a second integrated circuit configured to receive market data for the first instrument from a second market data feed and output a second subset of the received market data (e.g., round-lot levels for the second market).

In some embodiments, integrated circuits described herein can overcome the latency issues of software-implemented market-specific feed handlers using parallel hardware configurations. In one example, an integrated circuit described herein can be configured to receive market data for a first instrument from a first market data feed and output a first subset of the received market data having at least a first predetermined aggregate quantity. For example, predetermined aggregate quantity can be a lot size, such that the first subset of the received market data includes a round-lot quantity. In some embodiments, the integrated circuit can be configured to store aggregate quantities for each price level and can include comparators configured to compare the aggregate quantities to the predetermined aggregate quantities. Accordingly, in some embodiments, storing aggregate quantities and including parallel comparator configurations can allow for parallel computation of round-lot quantities, reducing the latency of such computations as compared to when executed on a general purpose processor.

In some embodiments, integrated circuits described herein can, alternatively or additionally, overcome the flexibility limitations of previous order book consolidators. In one example, an integrated circuit described herein can include a memory configured to store configuration parameters for the comparator circuits. In this example, the comparator circuits can be configured to select from among various market data feeds based on the configuration parameters to receive selected market data for consolidation (e.g., to calculate UBBO prices). Accordingly, integrated circuits described herein can be configured (e.g., on-the-fly) to consolidate and output selected market data information to create participant-specific (or participant group-specific) consolidated feeds. In some embodiments, memory onboard an integrated circuit described herein can be implemented as programmable read-only memory (PROM) that can be programmed prior to operation of the integrated circuit and/or random access memory (RAM) that can be rewritten during operation of the integrated circuit.

It should be appreciated that aspects described herein may be implemented alone or in combination with other aspects described herein. For example, improved feed handler configurations may be implemented alone or in a combined system with improved order book consolidator configurations, and/or vice versa.

Turning to the figures, FIG. 1 is a block diagram of an exemplary system 100 for multi-market order book consolidation, according to some embodiments. As shown in FIG. 1, system 100 includes feed handler circuits 102 and 106 implemented on FPGA nodes 101 and 105, respectively. As shown in FIG. 1, system 100 also includes an order book consolidator circuit 110 implemented on FPGA node 109. In some embodiments, FPGA nodes 101, 105, and 109 may be different FPGAs. While FIG. 1 shows FPGA node implementations of circuitry described herein, it should be appreciated that FPGA nodes 101, 105, and/or 109 may include one or more FPGAs, ASICs, and/or a combination thereof, according to various embodiments.

In some embodiments, one or more of feed handler circuits 102 and 106 can be co-located with order book consolidator circuit 110. In one example, feed handler circuits 102 and 106 can be associated with markets that are located in different geographical locations, such as with feed handler circuit 102 located in Carteret, New Jersey, and associated with the NASDAQ INET market and feed handler circuit 106 located in Secaucus, New Jersey, and associated with the CBOE BZX market. In this example, an order book consolidator circuit 110 can be co-located with feed handler circuit 102 and/or 106, such as in a data center at or within a few miles of the associated market(s). In some embodiments, order book consolidator circuit 110 can be co-located with feed handler circuit 102 and/or 106 at one or more data centers that are remote with respect to the associated markets. In some embodiments, input and/or outputs of feed handler circuit 102 and/or 106 and/or order book consolidator circuit 110 can be configured for communication over a network such as by optical fiber and/or wireless radio (e.g., millimeter wave). In this example, feed handler circuit 102 may be located in Carteret and configured to receive NASDAQ INET market updates via optical fiber and feed handler circuit 104 may be located in Secaucus and configured to receive CBOE BZX market updates via wireless radio. In some embodiments, one or more feed handler circuits 102 and 106 can be implemented on the same integrated circuit, circuit board, or circuit board assembly (e.g., on a same backplane), as order book consolidator circuit 110.

In some embodiments, feed handler circuits 102 and 106 may be configured to receive and process market data for multiple instruments from different market-specific feeds. In one example, feed handler circuit 102 may be configured to receive one or more feeds 103 from the NASDAQ INET market with market data for a first group of instruments and feed handler circuit 106 may be configured to receive one or more feeds 107 from the CBOE BZX market for a second group of instruments. In this example, each feed may publish market data in its own format. In some embodiments, feed handler circuits 102 and 106 may be configured to normalize market data received from the associated feeds 103 and 107 for outputting to order book consolidator circuit 110. For example, feed handler circuits 102 and 106 may be configured to receive market feed data indicating a status, trade, and/or a price and quantity of an instrument available to be traded on the associated market and output messages 104 and 108 indicating the status, trade, and/or price and quantity data as well as identifiers for the market and instrument. In some embodiments, feed handlers 102 and 106 may be configured to output messages having a same format. For example, feed handler circuits 102 and 106 may be configured to output the same instrument identifier for the same instrument such that the order book consolidator circuit receives the same instrument identifier for the same instrument even when market data is received from different market data feeds. In some embodiments, feed handler circuits 102 and 106 can be configurable to output certain defined data fields and/or use a specific encoding scheme, allowing for customized representation of market data (e.g., prices) in the output messages.

In some embodiments, order book consolidator circuit 110 may be configured to receive the output messages 104 and 108 from feed handler circuits 102 and 106 and generate consolidated order book update messages 111 for communicating to participants. For example, in some embodiments, the consolidated order book update messages 111 can include consolidated prices and quantities of instruments indicated in the messages 104 and 108 received from feed handler circuits 102 and 106.

The following example demonstrates how the system 100 can be configured to receive and consolidate market data from multiple market-specific feeds 103 and 107 and output the consolidated market data 111 to participants. In this example, Microsoft Stock (MSFT) may be traded in both the NASDAQ INET market and the CBOE BZX market. Feed handler circuit 102 can be configured to receive and normalize market data from a NASDAQ INET market-specific feed 103, including market data for instrument MSFT. Feed handler circuit 106 can be configured to receive and normalize market data from a CBOE BZX market-specific feed 107, including market data for instrument MSFT. At time t0, the first level of the order book for MSFT on NASDAQ INET, stored in feed handler circuit 102, includes a bid price of $125 consisting of two orders having an aggregated quantity of 100, and an ask price of $125.20 consisting of three orders having an aggregated quantity of 80. This top of book can be encoded into a message 104 as: "bid 100@$125 (2)/ask 80@$125.20 (3)." Meanwhile, at time t0, the first level of the order book for MSFT on CBOE BZX, stored in feed handler circuit 106, includes a bid price of $125 consisting of three orders having an aggregated quantity of 120, and an ask price of $125.20 consisting of two orders having an aggregated quantity of 65, which can be encoded into a message 108 as: "bid 120@$125(3)/ask 65@$125.2 (2)." Thus, at time t0, the first levels of the order books for the two markets are different.

In this example, still at time t0, order book consolidator circuit 110 recently sent a consolidated order book update message 111 with a first level for MSFT including a bid price of $125 with an aggregated quantity of 220 that identifies the NASDAQ INET and CBOE BZX markets and an ask price of $125.20 with an aggregated quantity of 145 that identifies the NASDAQ INET and CBOE BZX markets, which can be encoded into a message 111 as "bid 220@$125(INET, BZX)/ask 145@$125.20(INET, BZX)." That is, the order book consolidator circuit 110 may be configured to consolidate the quantities and prices in the messages 104 and 108 received from the feed handler circuits 102 and 106 and output consolidated update messages 111 with prices and quantities and indicating the instruments and relevant markets for the prices and quantities.

At time $t_1$, feed handler circuit 102 receives a packet from NASDAQ INET feed 103 including two messages indicating an execution of two orders of MSFT at the bid price of $125 having an aggregated quantity of 100, the first bid level of the NASDAQ INET order book for MSFT, encoded as: "100@$125(2)." Upon receiving the packet, feed handler circuit 102 can be configured to delete, from its memory, the previous first level bid price of $125 that consisted of two orders with an aggregated quantity of 100. Feed handler circuit 102 may be configured to automatically replace, in the memory, the first level bid price, quantity, and number of orders with the bid price, quantity, and number of orders previously stored in the second level, which may include a bid price of $124.98 consisting of one order having a quantity of 150, which can be encoded as: "bid 150@124.98." Feed handler circuit 102 can be configured to output an update message 104 to order book consolidator circuit 110 indicating the new first level bid price for MSFT on NASDAQ INET.

At time $t_2$, order book consolidator circuit 110 receives the update message 104 from feed handler circuit 102 indicating the new first level bid price for MSFT and can be configured to generate a new consolidated output message 111 with a first level bid price of $125 with an aggregated quantity of 120 that identifies the CBOE BZX market and a first level ask price of $125.20 with an aggregated quantity of 145 that identifies the NASDAQ INET AND CBOE BZX markets, which can be encoded in a message as: "bid 120@$125(BZX)/ask 145@$125.20(INET, BZX)." That is, the updated message 111 omits the previous quantity of MSFT that is no longer available on the NASDAQ INET market.

In this example, order book consolidator circuit 110 is configured to output messages 111 with consolidated instrument quantities with an indication of which markets the prices apply to, but not the quantity available on each market indicated in the message. It should be appreciated that, in some embodiments, order book consolidator circuit 110 can be configured to output messages 111 including the quantity available on each market and/or to omit the list of applicable markets from the output messages 111, as messages 111 can vary by particular implementation.

Figure 2:
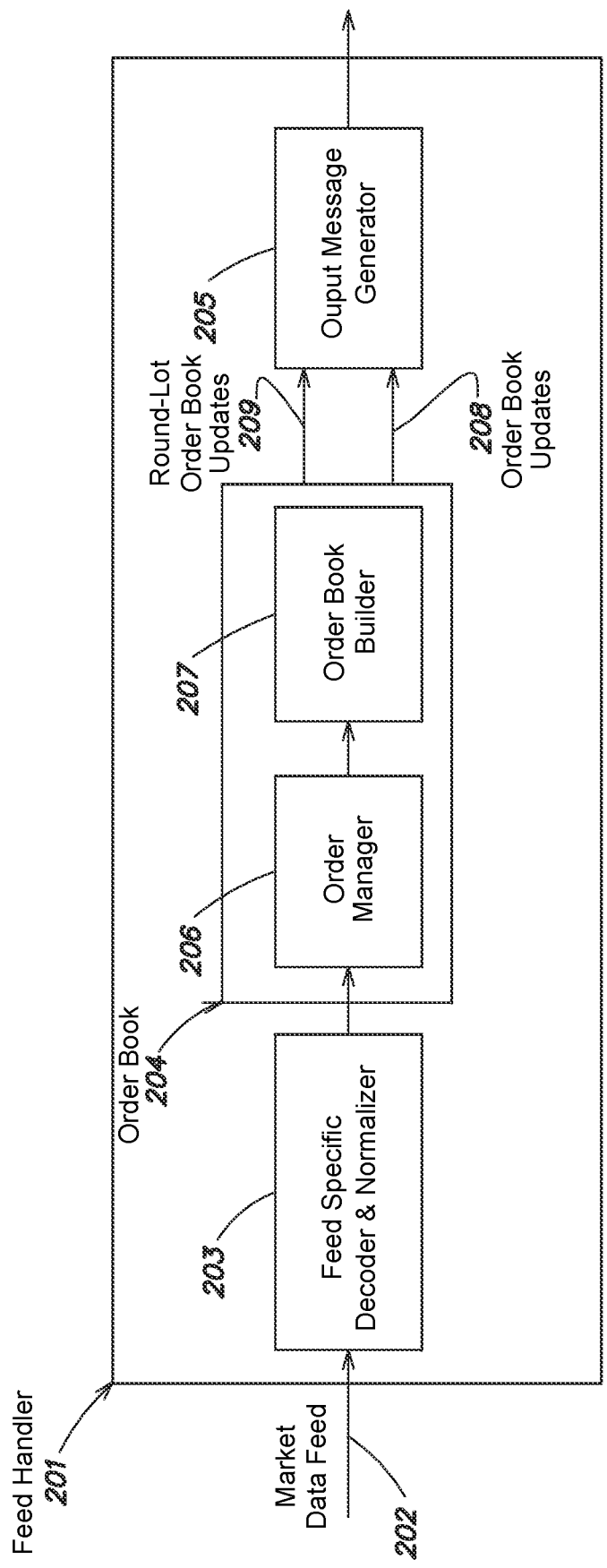
FIG. 2 is a block diagram of an exemplary feed handler circuit that may be included in the system of FIG. 1, according to some embodiments.

FIG. 2 is a block diagram of an exemplary feed handler circuit 201 that may be included in system 100, according to some embodiments. In FIG. 2, feed handler circuit 201 is configured to receive a market-specific feed 202, and includes a decoder circuit 203, an order book circuit 204, and an output message generator circuit 205.

In some embodiments, decoder circuit 203 may be configured to normalize market data from the feed 202 to generate updated market data commands for order book circuit 204. For example, in some embodiments, decoder circuit 203 may be adapted to receive and normalize messages in the format used by feed 202, which could be the NASDAQ INET market feed, in one example.

In some embodiments, order book circuit 204 may be configured to sort prices in the received market data into price levels, generate order book updates 208 and round-lot order book updates 209 based on the market data, and provide the updates 208 and 209 to output message generator circuit 203. As shown in FIG. 2, order book circuit 204 may include an order manager circuit 206 and an order book builder circuit 207. In some embodiments, the order manager circuit 206 can be configured to store and receive updates for open orders on the market associated with feed 202. For example, the order manager circuit 206 can include a memory configured to store price and quantity data for instruments traded on the associated market, which order manager circuit 206 can be configured to update in response to commands received from decoder circuit 203. In this example, when feed 202 indicates, via decoder circuit 203, that an order for a particular instrument has been closed or opened, order manager circuit 206 may be configured to delete or create an entry for the order.

In some embodiments, the order book builder circuit 207 can be configured to sort and aggregate data for each instrument from the orders stored by order manager circuit 206 to generate order book level price and quantity updates for output message generator circuit 205 to encode and output. For example, order book builder circuit 207 may be configured to compare prices of orders stored by order manager circuit 206 to generate a sorted list of price levels for each instrument with quantities of the instrument at each price level. In some embodiments, when a price and/or quantity of a price level changes in response to an update received from feed 202 via decoder circuit 203, order book builder circuit 207 may be configured to send an order book update 208 to output message generator circuit 205 for outputting from feed handler circuit 201. In some embodiments, order book builder circuit 207 may be configured to send an order book update 208 only when certain price levels change, such as the first price level and/or the first three price levels.

In some embodiments, order book builder circuit 207 may be configured to generate round-lot order book updates 209 using aggregated quantities stored for each price level. In one example, order book builder circuit 207 may be configured to aggregate a quantity from price level 1 to price level N and compare the aggregated quantity to a predetermined lot size (e.g., stored in memory) to determine whether price level N is a round-lot price level for generating and sending round-lot order book updates 209. In this example, order book builder circuit 207 may be configured to determine whether the aggregated quantity from price level 1 to price level N is greater than or equal to the lot size to determine whether price level N is a round-lot level.

In some embodiments, output message generator circuit 205 may be configured to encode and send messages through a communication interface such as an ethernet port and/or peripheral components interconnect (PCI) express bus.

Figure 3:
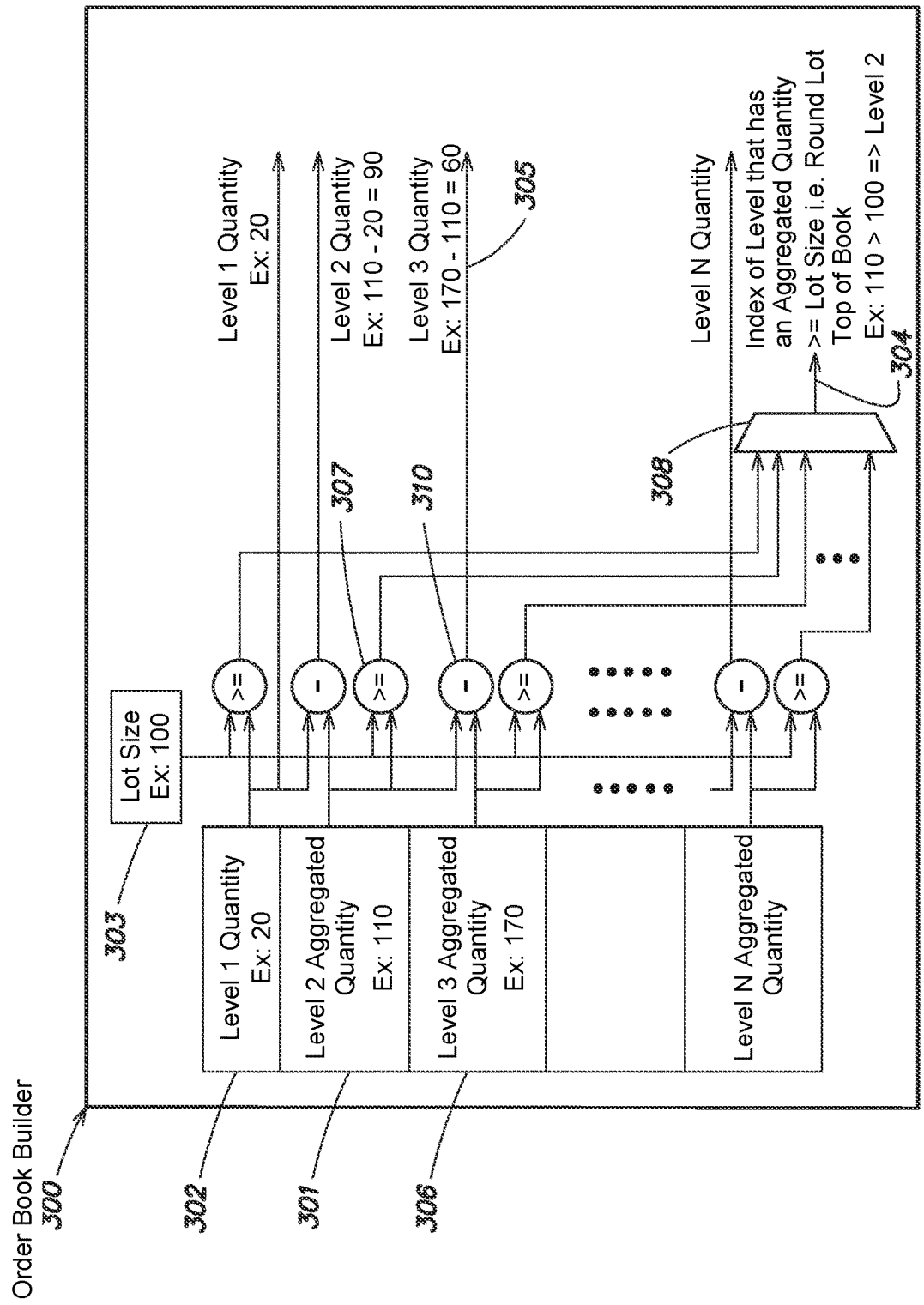
FIG. 3 is a circuit diagram of an exemplary order book builder circuit that may be included in the feed handler circuit of FIG. 2, according to some embodiments.

FIG. 3 is a circuit diagram of an exemplary order book builder circuit 300 that may be included in feed handler circuit 201, according to some embodiments. In some embodiments, order book builder circuit 300 may be configured to output price level quantities for order book updates as well as an indication of which price level is the first round-lot price level.

In some embodiments, order book builder circuit 300 can include a memory configured to store aggregated quantities for various price levels of an instrument as well as a predetermined lot size 303 for the instrument. For example, as shown in FIG. 3, price level 1 has an aggregated quantity 302 of 20, price level 2 has an aggregated quantity 301 of 110, including a quantity of 20 from price level 1, and price level 3 has an aggregated quantity 306 of 170, including a quantity of 110 from price levels 1-2. In some embodiments, order book builder circuit 300 can include subtractors, each configured to subtract, from the aggregated quantity of a given price level, the aggregated quantity of the preceding price level to obtain the quantity of the given price level. For example, as shown in FIG. 3, subtractor 310 is shown configured to subtract the aggregated quantity 301 of 110 of price level 2 from the aggregated quantity 306 of 170 of price level 3, resulting in the quantity 305 of 60 being output for price level 3.

In some embodiments, order book builder circuit 300 can include a comparator circuit with comparators configured to compare the aggregated quantity of a given price level to the predetermined lot size 303 and output comparison results to an encoder 308. For example, in FIG. 3, price level 2 has an aggregated quantity of 110, which is greater than the predetermined lot size 303 of 100, as may be determined by comparator 307 and output to encoder 308. Accordingly, as shown in FIG. 3, the encoder 308 may be configured to output an indication 304 that price level 2 is the first round-lot price level.

The inventors recognized that round-lot price levels could be determined by aggregating quantities stored for each price level, but that such techniques add delays that are unsuitable for some applications. For example, on a general purpose processor, aggregating quantities of price levels in real time uses at least one clock cycle per aggregated price level to perform the determination. Moreover, since the number of price levels that need to be aggregated to reach the round-lot quantity can vary depending on the quantity at each price level, the latency of the determination can vary widely in turn.

In FIG. 3, on the other hand, by storing aggregated quantities of the instrument for at least some price levels, round-lot price levels can be determined using a parallel configuration of comparators, and individual price level quantities can be determined using a parallel configuration of subtractors. For example, in some embodiments, each comparison can be performed in parallel during a single clock cycle and/or in parallel with subtractions that generate individual price level quantities. In this example, the order book builder circuit 300 may be configured to output individual level quantities and an indication of which price level is the first round-lot price level at the same time (e.g., within the same clock cycle or within one to three clock cycles). Thus, by storing aggregated quantities for at least some price level of an instruments and/or using parallel comparator and/or subtractor circuits, integrated circuits described herein can be configured to provide round-lot order book updates with lower latency than general purpose processors.

Moreover, while the order book builder circuit 300 is shown configured only to output an indication of the first round-lot price levels, it should be appreciated that, in some embodiments, the order book builder circuit 300 may be configured to output indications of multiple round-lot price levels up to and including each round-lot price level for an order book. According to various examples, such round-lot order books can have any number of levels, such as the first five round-lot levels or the first twenty round-lot levels.

Figure 4A:
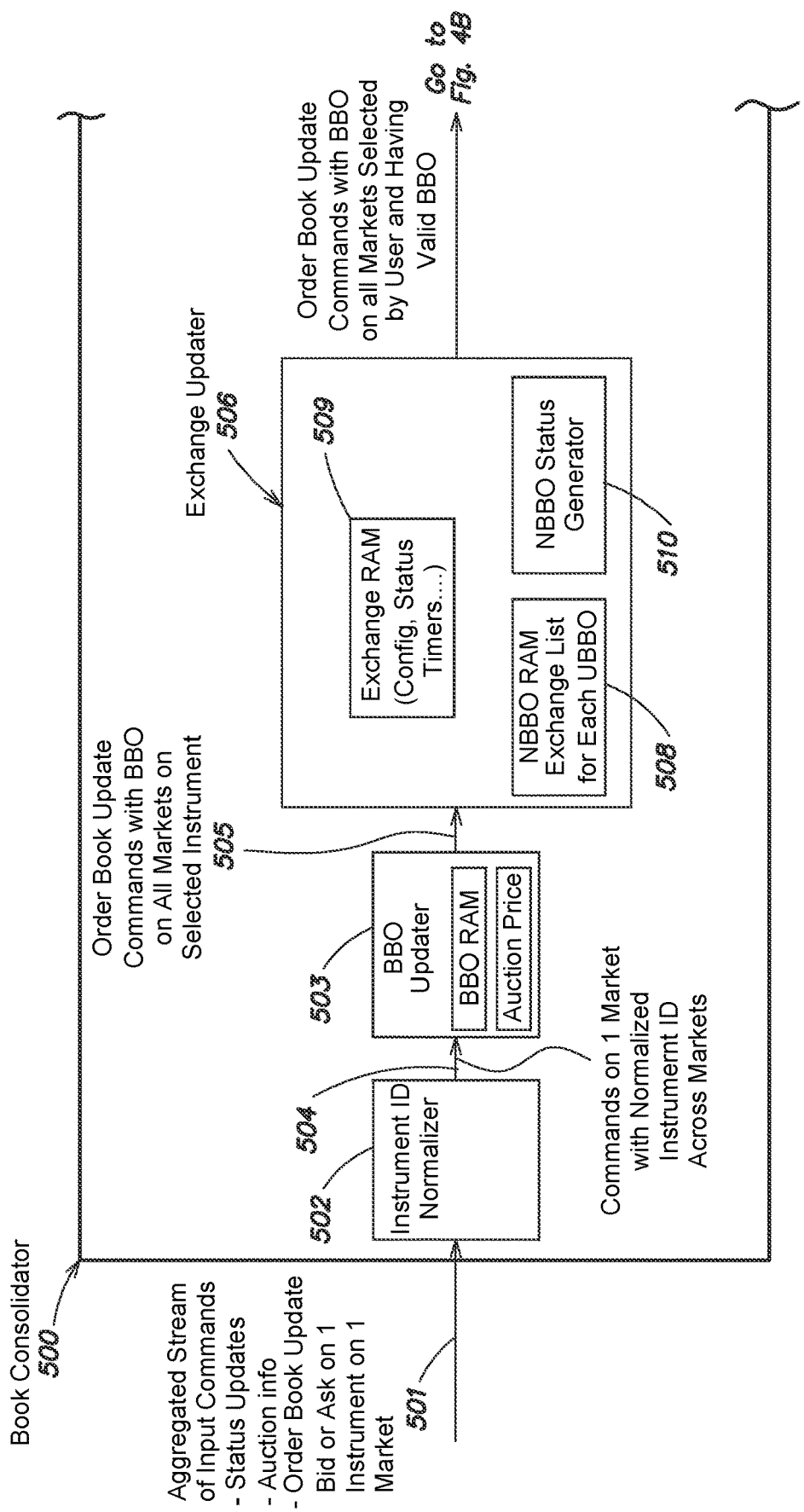
FIG. 4A is a first portion of a block diagram of an exemplary order book consolidator circuit that may be included in the system of FIG. 1, according to some embodiments.
Figure 4B:
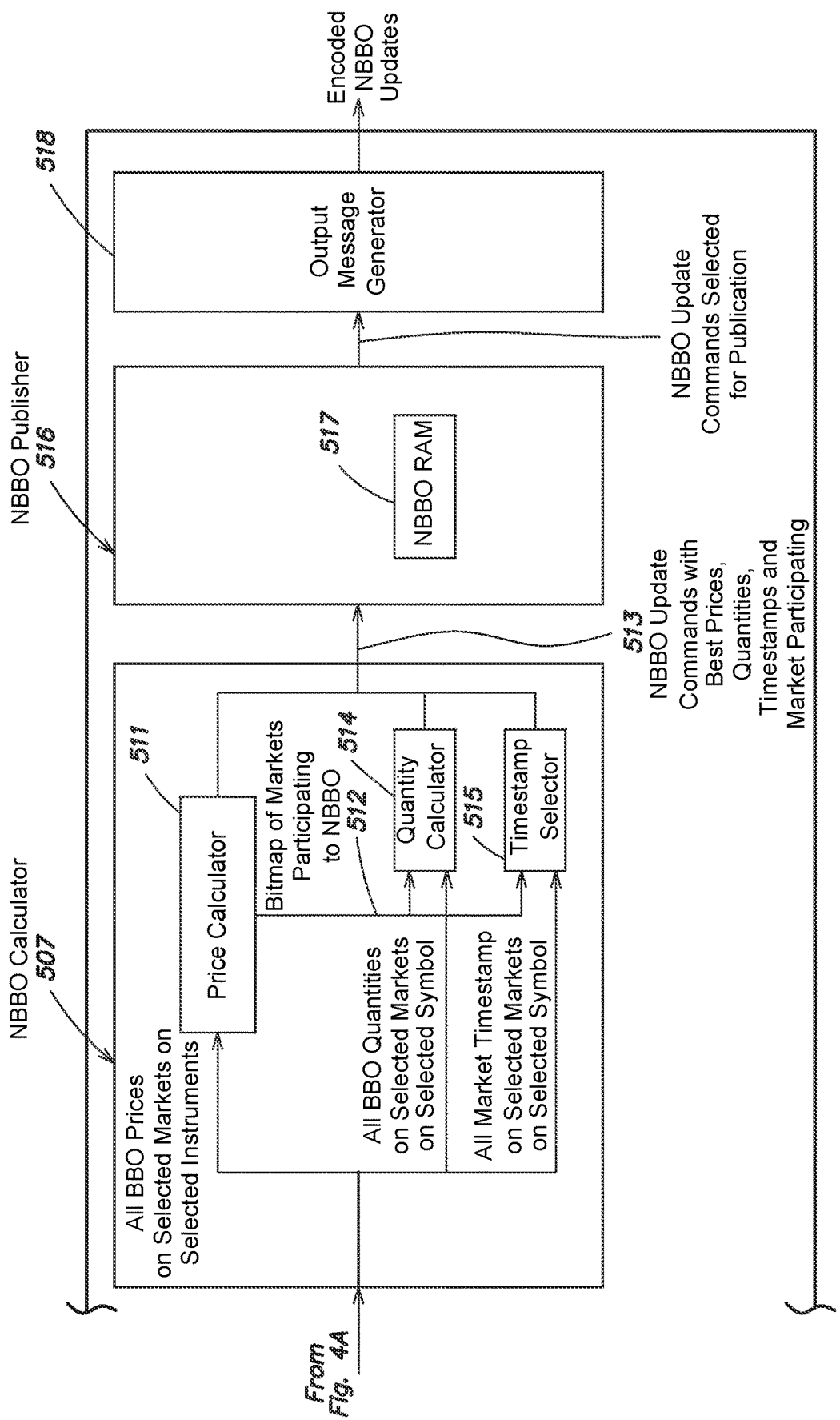
FIG. 4B is a second portion of the block diagram of the exemplary order book consolidator circuit of FIG. 4A, according to some embodiments.

FIG. 4A is a first portion of a block diagram of an exemplary order book consolidator circuit 500 that may be included in the system 100, according to some embodiments. FIG. 4B is a second portion of the block diagram of order book consolidator circuit 500, according to some embodiments. As shown in FIGS. 4A-4B, order book consolidator circuit 500 includes normalizer circuit 502, BBO updater circuit 503, exchange updater circuit 506, NBBO calculator circuit 507, NBBO publisher circuit 516, and output message generator circuit 518. While a single NBBO calculator circuit 507 is shown in FIGS. 4A-4B, an order book consolidator circuit 500 can include any number of NBBO calculator circuits 507, such as configured to calculate NBBO prices for different lists of markets (e.g., different NBBO and/or UBBO prices).

In some embodiments, normalizer circuit 502 may be configured to receive market data updates 501 from one or more feed handler circuits, such as feed handler circuits 102 and/or 106 shown in FIG. 1 and/or feed handler circuit 201 shown in FIG. 2. For example, each feed handler circuit may be configured to receive and process a market-specific data feed and provide market data updates 501 to normalizer circuit 502. In some embodiments, updates 501 may include status updates, auction update, and/or order book updates for one or more instruments on any or each market, which may be used for BBO price calculation by order book consolidator circuit 500. For example, a status update may indicate when an instrument is not available to be traded, in auction, or in trading. Auction and order book updates can provide price and quantity data to be included in BBO calculation (e.g., potential auction prices). In some embodiments, normalizer circuit 502 may be configured to send commands 504 to BBO updater circuit 503 and/or elsewhere in order book consolidator circuit 500 based on received updates 501. For example, in some embodiments, commands 504 may include new statuses, prices, and/or quantities for updated BBO calculation across multiple market data feeds.

In some embodiments, normalizer circuit 502 may be configured to identify, in updates 501, each instrument (or symbol) for each market, and output the same instrument identifier for the same instrument identified in market data from different market data feeds. For example, some or each market data feed may use a different identifier for the same instrument, and normalizer circuit 502 may include a hash table or other linking/mapping device (e.g., configurable by software) that associates each received instrument identifier for the same instrument, across multiple market data feeds, to a same instrument identifier, which may be compatible with other circuitry of order book consolidator circuit 500.

In some embodiments, BBO updater circuit 503 may be configured to store one or more statuses and/or order book price levels for each instrument for each market-specific feed from which order book consolidator circuit 500 is configured to consolidate market data. For example, as shown in FIGS. 4A-4B, BBO updater circuit 503 may be configured to store, in BBO RAM, only the first price level of an order book for each instrument for each market. In some embodiments, BBO updater circuit 503 may be configured to store multiple price levels of the order book for each instrument in RAM. Also shown in FIGS. 4A-4B, BBO updater circuit 503 may be configured to store auction statuses and/or auction prices received via commands 504 from normalizer circuit 502.

In some embodiments, BBO updater circuit 503 may be configured to calculate and output order book update commands 505 for each instrument for each market. For example, in some embodiments, when a new level 1 price for MSFT is received at order book consolidator circuit 500 via the NASDAQ INET feed and a dedicated feed handler circuit, BBO updater circuit 503 may be configured to update level 1 of its stored order book for MSFT on NASDAQ INET to reflect the new level 1 price and output an update command 505 with the new level 1 price to exchange updater 506 for multi-market BBO price calculation.

In some embodiments, exchange updater circuit 506 may be configured to output order book updates to NBBO calculator circuit 507 for NBBO price calculation for an instrument on a selected subset of markets. As shown in FIGS. 4A-4B, exchange updater 506 can include NBBO RAM 508, exchange RAM 509, and NBBO status generator circuit 510. In some embodiments, NBBO RAM 508 may be configured to store one or more lists of markets to include in one or more BBO price calculations to be performed by NBBO calculator 507. For example, one stored list may include all markets required for United States NBBO price calculation and another list may include the markets of the New Jersey Triangle for a user-defined and/or popular UBBO price calculation. In some embodiments, exchange updater circuit 506 may be configured to send order book updates to NBBO calculator 507 for markets included in the list(s) of markets stored in NBBO RAM 508. For example, exchange updater circuit 506 may be configured to output the order book updates in parallel to multiple NBBO calculator circuits 507 for calculating multiple NBBO prices corresponding to different lists of markets stored in NBBO RAM 508. In this example, one NBBO calculator circuit 507 could be configured to calculate United States NBBO prices selectively received from exchange updater circuit 507 and another NBBO calculator circuit 507 could be configured to calculate New Jersey Triangle UBBO prices.

In some embodiments, exchange updater circuit 506 may be configured to store configuration parameters in exchange RAM 509, which can be used to control which markets are included in NBBO price calculation by NBBO calculator circuits 507. For example, in FIGS. 4A-4B, exchange RAM 509 may be configured to store configuration parameters for lists of markets stored in NBBO RAM 508. In some embodiments, exchange updater circuit 506 may be configured to output configuration parameters to each NBBO calculator circuit 507, corresponding to the stored list of markets for that NBBO calculator circuit 507, and the NBBO calculator circuit can be configured to select a subset of markets for inclusion in NBBO price calculations based on the configuration parameters. For example, exchange RAM 509 may store a first set of configuration parameters for a first NBBO calculator circuit 507 that, when received by the NBBO calculator circuit 507, cause it to selectively receive prices for an instrument for markets in United States NBBO price calculations. In this example, exchange RAM 509 may store a second set of configuration parameters for a second NBBO calculator circuit 507 that, when received by the NBBO calculator circuit 507, cause it to selectively receive prices for the same instrument for markets in New Jersey Triangle UBBO price calculations.

In some embodiments, exchange updater 506 may be configured to store a status for each instrument for each market to be included in NBBO price calculations, which can be used to determine which updates to provide to the NBBO calculator circuits 507. For example, the stored status can indicate whether an update has been received for the instrument for the market, whether the instrument has been inactive on the market for at least a predefined period of time, whether the instrument is at auction on the market, whether the instrument is unavailable to be traded on the market, and/or whether the instrument is experiencing an error on the market. In some embodiments, when a status indicates an instrument is at auction, exchange updater 506 may be configured to provide, to the NBBO calculator circuits 507, the most appropriate price (e.g., higher bid price and/or lower ask price) from among the order book level 1 price and the potential auction price.

In some embodiments, exchange updater circuit 506 can be configured to update configuration parameters in exchange RAM 509 to exclude data for markets that have not sent an update during a predefined period of time. For example, NBBO status generator circuit 510 can be configured to periodically monitor a timer to determine whether an update has been received from a market during the predefined period of time and update a status of the market in exchange RAM 509 and/or to update the status of the market once an update has been received.

In some embodiments, NBBO calculator circuit 507 can be configured to determine one or more consolidated BBO price levels for an instrument over multiple markets. For example, NBBO calculator circuit 507 may be configured to receive level 1 prices for MSFT from all United States NBBO markets with quantities for each market and output consolidated level 1 prices for MSFT over the United States NBBO markets. As shown in FIGS. 4A-4B, NBBO calculator circuit 507 can include a price calculator circuit 511, a quantity calculator circuit 514, and a timestamp selector circuit 515.

In some embodiments, the price calculator circuit 511 can be configured to receive BBO prices of an instrument from a selected subset of markets from exchange updater circuit 506 and compare the received prices to output one or more consolidated BBO price levels (e.g., the highest bid price(s) and/or the lowest ask price(s) across the markets). For example, the price calculator circuit 511 can include a comparator tree for each price level to be determined and/or for both ask and bid sides of the order book. In this example, comparators of each comparator tree can be configured to receive and compare prices in parallel to determine BBO prices substantially at the same time (e.g., within the same clock cycle or within a few clock cycles) and with low latency as compared to a general purpose processor executing software calculations sequentially. In some embodiments, the price calculator circuit 511 can be configured to generate and output a bitmap 512 indicating which markets have prices included in the multi-market BBO prices. For example, the quantity calculator circuit 514 and/or timestamp selector 515 may be configured to process quantities and/or timestamps only for markets having prices included in the bitmap 512.

In some embodiments, multiple NBBO calculator circuits 507 can be coupled in parallel and configured to generate consolidated BBO prices for different subsets of markets, such as based on different configuration parameters from exchange updater circuit 506. The inventors recognized that such parallel hardware configurations can generate consolidated BBO prices for different subsets of markets with lower latency than when executed on a general purpose processor. For example, in contrast to the general purpose processor, which can only determine consolidated BBO prices for one subset of markets at a time, integrated circuits described herein can include comparator circuits for each subset of markets for which consolidated BBO prices are to be calculated, allowing for multiple consolidated BBO prices to be calculated and output in parallel, with lower latency than the sequential operations of general purpose processors.

In some embodiments the quantity calculator circuit 514 can be configured to receive quantities of the instrument from exchange updater circuit 506, select quantities included in the bitmap 512, and determine and output aggregated quantities for each BBO price level output by the price calculator circuit 511. For example, the price calculator circuit 511 can be configured to output an indication, based on comparison results, that two or more BBO prices received from multiple markets are equal, and quantity calculator circuit 514 may be configured to consolidate quantities of the instrument from the markets having equal BBO prices. Alternatively or additionally, in some embodiments, quantity calculator 514 may be configured to output individual quantities of the instrument for each market included in the bitmap 512.

In some embodiments, the timestamp calculator circuit 515 can be configured to receive timestamps from the exchange updater circuit 506 for each BBO price received at the price calculator circuit 511 (e.g., timestamps of publication on the market-specific feed), select a subset of the timestamps based on the bitmap 512, and determine and output the latest timestamp. For example, the timestamp can inform participants how recently the market data used to determine the BBO prices was received.

In some embodiments, the NBBO publisher circuit 516 can be implemented as an output control circuit configured to filter NBBO price updates for outputting via output message generator circuit 518. For example, the NBBO publisher circuit 516 can be configured to filter out NBBO price updates having the same prices as a previous update (e.g., same level 1 prices or same level 1-3 prices) and/or having less than a threshold change in available quantities at the BBO prices.

In some embodiments, the NBBO publisher circuit 516 can be configured to generate and/or store consolidated BBO prices (e.g., periodically). As shown in FIGS. 4A-4B, the NBBO publisher circuit 516 can include an NBBO RAM 517 configured to store at least some updates and/or BBO prices, quantities, and/or timestamps. For example, participants may be able to request a previous consolidated update be re-generated by output message generator circuit 518 via NBBO publisher circuit 516.

In some embodiments, output message generator circuit 518 may be configured to encode output messages. For example, output message generator circuit 518 may be configured to normalize outputs from NBBO calculator circuit(s) 507 and encode the updates for serializing over an Ethernet and/or PCI express interface. In some embodiments, the output message generator circuit 518 may be configured to include only consolidated BBO prices and aggregated quantities, whereas in other embodiments, the output message generator circuit 518 may be configured to output relevant markets for the consolidated BBO prices, individual quantities per market, and/or timestamps.

Figure 5A:
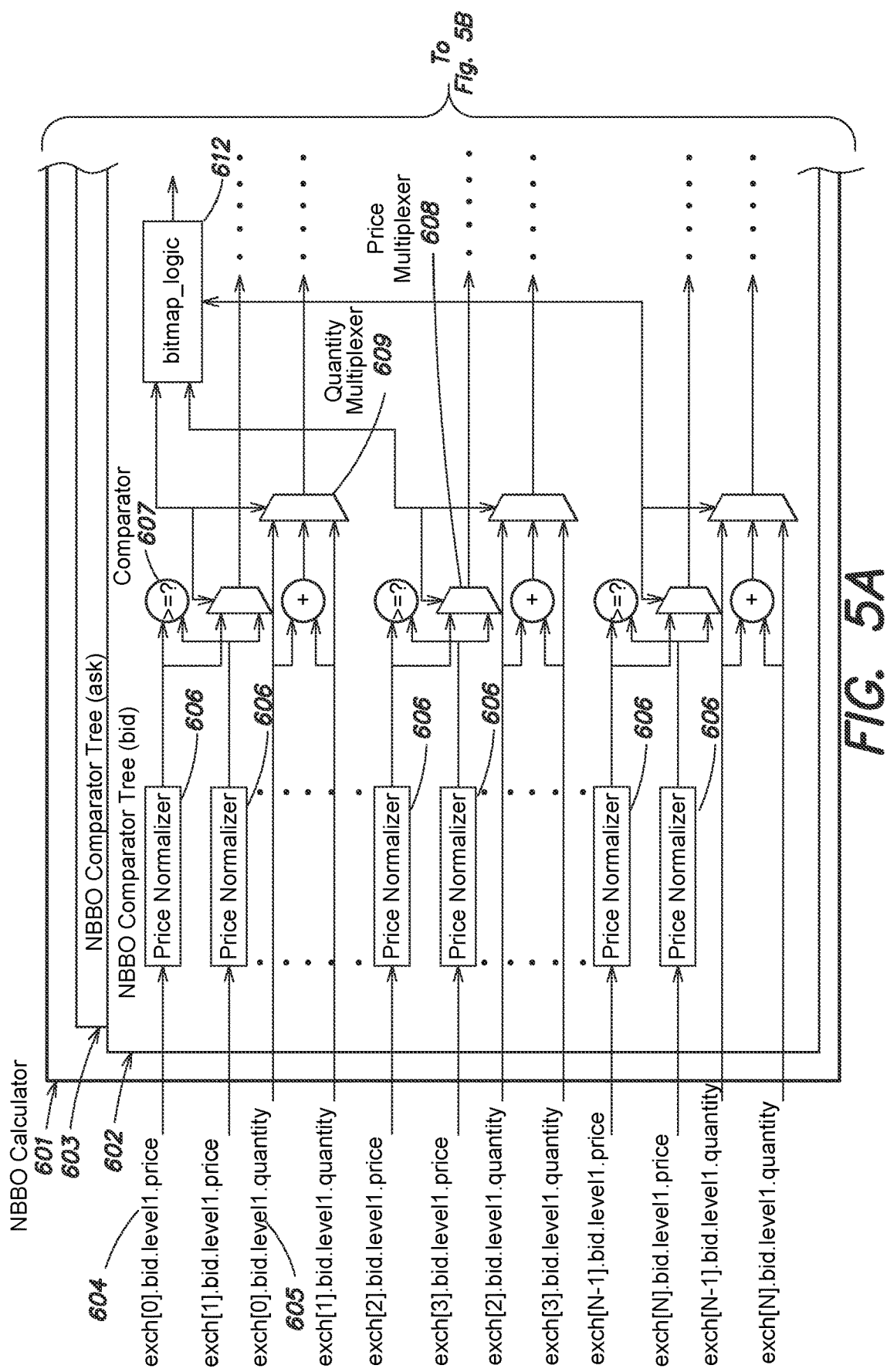
FIG. 5A is a first portion of a circuit diagram of exemplary comparator circuitry configured to implement a consolidated price calculator, which may be included in the order book consolidator circuit of FIGS. 4A-4B, according to some embodiments.
Figure 5B:
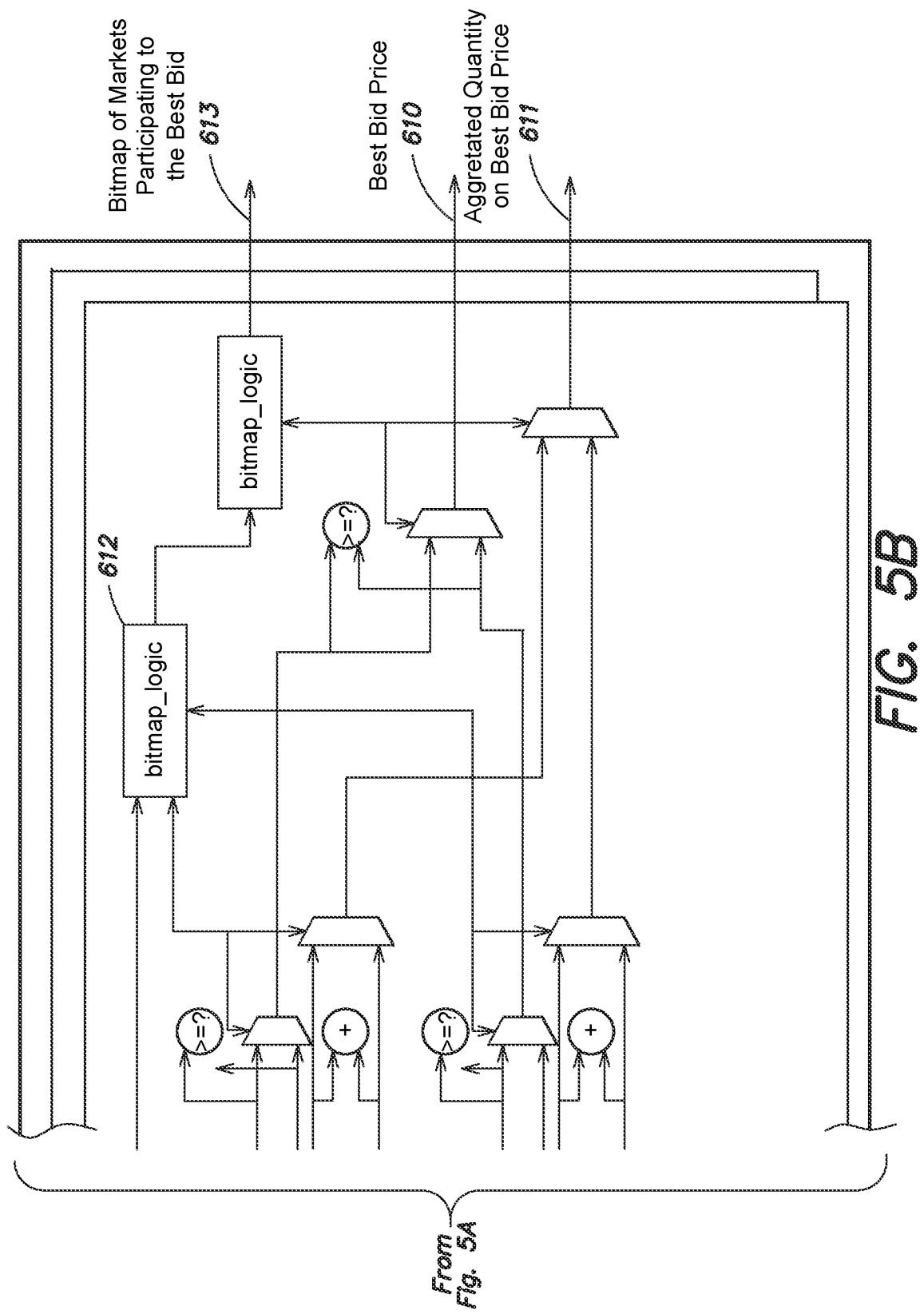
FIG. 5B is a second portion of the circuit diagram of the comparator circuitry of FIG. 5A, according to some embodiments.

FIG. 5A is a first portion of a circuit diagram of exemplary comparator circuitry configured to implement an NBBO calculator circuit 601, which may be included in the order book consolidator circuit 500, such as an NBBO calculator circuit 507, according to some embodiments. FIG. 5B is a second portion of the circuit diagram of the comparator circuitry configured to implement the NBBO calculator circuit 601, according to some embodiments.

In some embodiments, NBBO calculator circuit 601 can include one or more comparator trees, such as bid-side comparator tree 602 and ask-side comparator tree 603 shown in FIGS. 5A-5B. In some embodiments, each comparator tree can be configured to calculate one consolidated BBO price level over multiple markets. For example, in FIGS. 5A-5B, bid-side comparator tree 602 is shown configured to calculate the level 1 consolidated BBO price for N different markets. The bid-side comparator tree 602 is shown in FIGS. 5A-5B including price normalizers 606, which can be configured to normalize the format of received BBO prices. For example, the price normalizers 606 can be configured to ensure each BBO price uses a same precision of digits (e.g., after a decimal point) and/or uses a same number of bits for mantissa and/or exponent in floating point.

In some embodiments, each comparator tree can be configured to receive (e.g., at each clock cycle), updated BBO prices and quantities for multiple markets, and calculate consolidated BBO prices and aggregated quantities across the markets. For example, in FIGS. 5A-5B, bid-side comparator tree 602 includes comparators 607 and price multiplexers 608 (e.g., price calculator circuitry) configured to receive BBO prices 604 and quantity multiplexers 608 (e.g., quantity calculator circuitry) configured to receive quantities 605 for each BBO price 604. In some embodiments, comparators 607 of the bid-side comparator tree 602 can be configured to determine and select the highest BBO prices via price multiplexers 608, which may be configured to output the selected BBO prices to bitmap logic 612 to generate a consolidated BBO bitmap 613 to be output. In some embodiments, quantity multiplexers 608 may be configured to select and output the quantity corresponding to the highest BBO bid price determined and selected by comparators 607 and/or to add quantities of BBO prices determined to be equal by comparators 607.

As shown in FIGS. 5A-5B, outputs of each comparator 607 may be compared against outputs of other comparators 607 until a highest BBO bid price 610 has been determined by bid-side comparator tree 602 and can be output. Likewise, at each comparator stage, quantities of equal price can be consolidated until an aggregated quantity 611 at the highest BBO bid price 610 can be output. In some embodiments, the output bitmap 613 can indicate which markets the highest BBO bid price 610 corresponds to, such as including a 1 for each market having the highest BBO bid price 110. For example, the bitmap logic 612 can have a series of stages (e.g., one for each stage of comparators 607 in the comparator tree) with each taking the output of the previous bitmap logic stage as an input to be updated. In some embodiments, comparators of the ask-side comparator tree 603 can be configured to determine and select lowest BBO prices substantially in the same manner as described for bid-side comparator tree 602.

The inventors recognized that parallel hardware configurations, such as the comparator tree configurations shown in FIGS. 5A-5B, can generate consolidated order book updates across multiple markets with lower latency than general purpose processors, which can be constrained to perform only one price comparison or quantity consolidation per clock cycle. For example, consolidated order book calculations can take into account BBO prices, quantities, timestamps, and statuses for each relevant market, which is a large enough amount of data for a general purpose processor to handle that it can cause cache misses and variations in the number of required clock cycles (e.g., depending on how much updated data is to be taken into account at a given time). Unlike general purpose processors that perform computations sequentially, integrated circuits described herein can include parallel hardware configurations, such as comparator trees shown in FIGS. 5A-5B, that can perform comparisons and/or quantity aggregations in parallel, resulting in fewer clock cycles to calculate BBO prices across multiple markets. In one example, an integrated circuit described herein can be configured to generate a consolidated single-sided (e.g., ask or bid) order book update every clock cycle (e.g., 3 nanoseconds or shorter), and/or a consolidated double-sided (e.g., ask and bid) order book update every two clock cycles (e.g., 6 nanoseconds or shorter). In this example, the latency of consolidation can be on the order of hundreds of nanoseconds, even during a data burst update during which hundreds of millions of order book updates per second are received from market data feeds.

It should be appreciated that, in some embodiments, the NBBO calculator circuit 601 can be configured to generate consolidated BBO prices for different subsets of markets at different times. For example, the exchange updater circuit 506 can be configured to update the configuration parameters provided to the NBBO calculator circuit 601 between BBO price calculations. It should also be appreciated that, in some embodiments, the NBBO calculator circuit 601 can be configured to produce more than one price level of a consolidated order book. For example, each comparator tree can include intermediate comparators and quantity multiplexers configured to output additional consolidated price levels for the markets.

Figure 6:
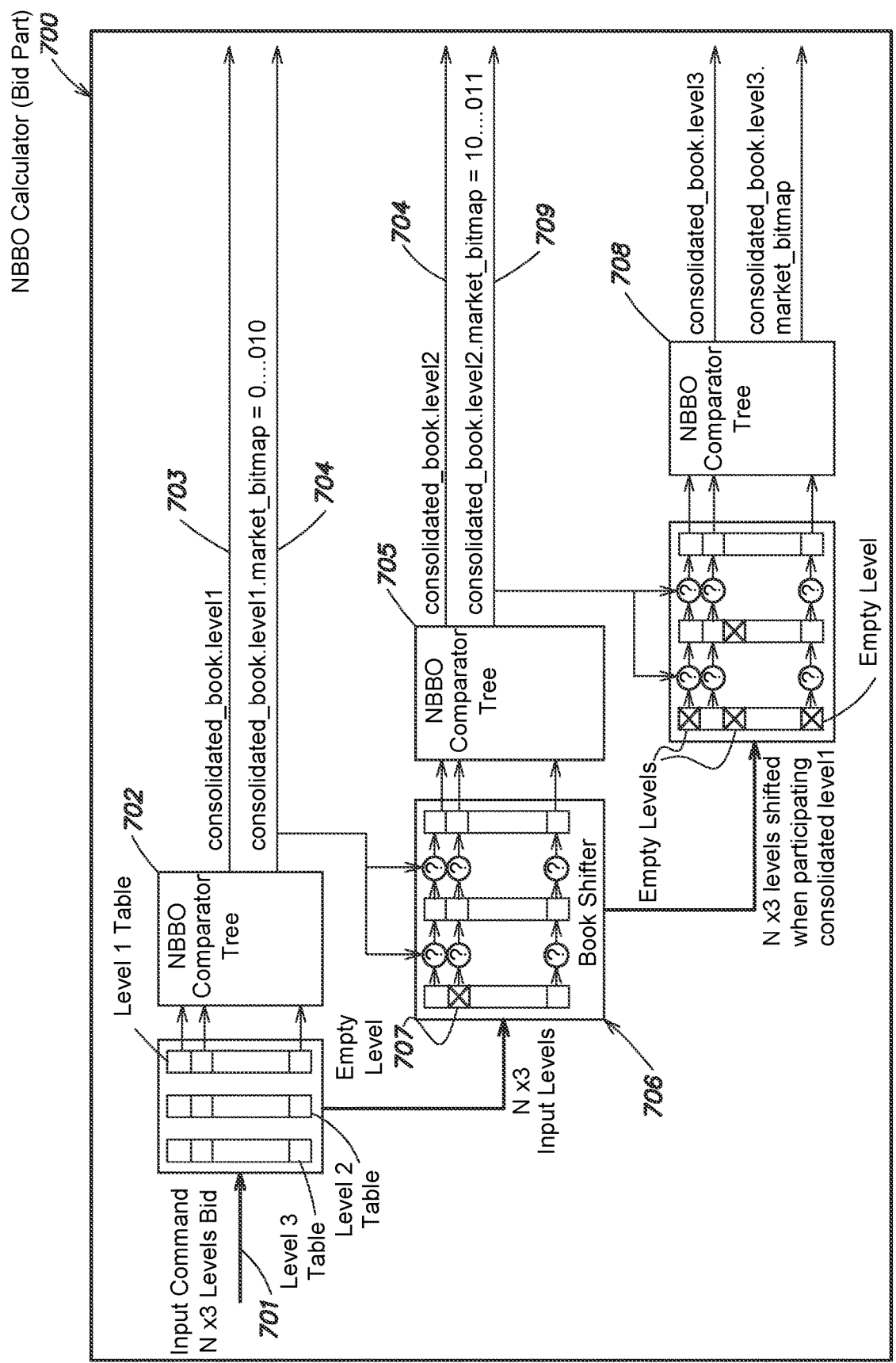
FIG. 6 is a block diagram of alternative or additional exemplary comparator circuitry configured to implement a multi-level consolidated price calculator, which may be included in the order book consolidator circuitry of FIGS. 4A-4B, according to some embodiments.

FIG. 6 is a block diagram of exemplary comparator circuitry configured to implement a multi-level NBBO calculator circuit 700, which may be included in the order book consolidator circuitry of FIGS. 4A-4B, according to some embodiments. As shown in FIG. 6, the bid-side of NBBO calculator circuit 700 can include multiple comparator trees 702, 705, and 708 configured to generate and output different NBBO price levels 1-3, respectively. Although not shown in FIG. 6, it should be appreciated that the ask-side of the NBBO calculator circuit 700 can be configured in substantially the same manner.

In some embodiments, each comparator tree 702, 705, and 708 can be configured to generate and output NBBO prices and quantities in the manner described herein for bid-side comparator tree 602 in connection with FIG. 6. In some embodiments, comparator tree 702 may be configured to receive BBO prices 701 including BBO levels 1-3 from each market and generate and output consolidated level 1 BBO prices 703 over the various markets as well as a level 1 bitmap 704 indicating which markets correspond to the level 1 BBO prices 703. In some embodiments, comparator tree 705 may be configured to receive the same BBO prices 701 as comparator tree 702 and also the bitmap 704 to generate and output consolidated level 2 BBO prices 704 and a level 2 bitmap 709 indicating which markets correspond to the level 2 BBO prices 704. For example, the level 1 bitmap may indicate which markets' level 1 are not included in the consolidated level 1 BBO prices 703, based on which, comparator tree 705 may be configured to calculate consolidated level 2 BBO prices 704 using the level 1 prices for those markets rather than the level 2 prices for those markets.

In some embodiments, a book shifter 706 may be configured to shift prices between levels 1 and 2 for comparator tree 705 based on the level 1 bitmap 704. For example, as shown in FIG. 6, the book shifter 706 can have empty level 3 prices for some markets 707 due to the level 3 prices of those markets being shifted into level 2 and the markets' level 2 prices being shifted into level 1. In some embodiments, comparator tree 708 may be configured to generate and output consolidated level 3 BBO prices and a level 3 bitmap in substantially the same manner as comparator tree 705, further incorporating level 2 prices for markets not included in the consolidated level 2 BBO prices 704 based on the level 2 bitmap 709.

It should be appreciated that techniques and operations of circuits described herein can be embodied in one or more methods.

While the use of the terms "first," "second," and so on, as used herein to refer to levels of an order book, can require the prices stored in the first and second levels of the order book to have a certain order or ranking (e.g., first level bid price is higher than second level bid price), it should be appreciated that other uses of the terms "first," "second," and so on do not require any order or ranking.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or equivalently, "at least one of A or B," or equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately," "substantially," and "about" may be used to mean within +/−20% of a target value in some embodiments, within +/−10% of a target value in some embodiments, within +/−5% of a target value in some embodiments, and within +/−2% of a target value in some embodiments. The terms "approximately" and "about" may include the target value.

What is claimed is:

1. A network appliance, comprising:
a field programmable gate array (FPGA) and/or application specific integrated circuit (ASIC) comprising a plurality of digital logic gates comprising:
  comparator circuitry, comprising:
    a first comparator input terminal configured to receive a first price value;
    a second comparator input terminal configured to receive a second price value in parallel with the first comparator input terminal receiving the first price value; and
    a comparator output terminal configured to, in response to the first comparator input terminal and the second comparator input terminal receiving the first price value and the second price value in parallel, respectively, provide an output indicating a comparison result of the first price value at the first comparator input terminal with respect to the second price value at the second comparator input terminal; and
  multiplexing circuitry, comprising:
    a first multiplexer input terminal configured to receive a first quantity value;
    a second multiplexer input terminal configured to receive a second quantity value in parallel with the first multiplexer input terminal receiving the first quantity value; and
    a multiplexer output terminal configured to, in response to the first multiplexer input terminal and the second multiplexer input terminal receiving the first quantity value and the second quantity value in parallel, respectively, provide an output quantity value from among at least the first multiplexer input terminal and the second multiplexer input terminal,
    wherein the comparator output terminal is coupled to a terminal of the multiplexing circuitry such that the output from the multiplexer output terminal is based, at least in part, on the comparison result indicated by the comparator output terminal,
  wherein the plurality of digital logic gates are configured to:
    receive market data for a first instrument from a plurality of market data feeds, the market data comprising:
      first market data comprising a first price of the first instrument and a first quantity of the first instrument at the first price from a first market data feed of the plurality of market data feeds; and
      second market data comprising a second price of the first instrument and a second quantity of the first instrument at the second price from a second market data feed of the plurality of market data feeds;
    process the first market data and the second market data in parallel, using the comparator circuitry to receive the first price of the first instrument at the first comparator input terminal and the second price of the first instrument at the second comparator input terminal in parallel with the first comparator input terminal receiving the first price of the first instrument, and using the multiplexing circuitry to receive the first quantity of the first instrument at the first multiplexer input terminal and the second quantity of the first instrument at the second multiplexer input terminal in parallel with the first multiplexer input terminal receiving the first quantity of the first instrument, to output, based on the comparison result output from the comparator output terminal and the output quantity value output from the multiplexer output terminal, consolidated market data comprising a consolidated price of the first instrument and a consolidated quantity of the first instrument at the consolidated price across at least the first market data feed and the second market data feed; and
    communicate the consolidated market data for the first instrument to a market participant over a network with a consolidation latency of less than 5 microseconds.

2. The network appliance of claim 1, wherein the comparator circuitry comprises a first comparator tree comprising a plurality of comparators each configured to receive price data for the first instrument from the plurality of market data feeds.

3. The network appliance of claim 1, wherein:
the comparator circuitry further comprises:
  a third comparator input terminal configured to receive the second price from the second market data feed;
  a fourth comparator input terminal configured to receive a third price for the first instrument from a third market data feed of the plurality of market data feeds; and
  a second comparator output terminal configured to provide an output indicating a comparison result of the second price with respect to the third price; and
the plurality of digital logic gates further comprises an output circuit configured to generate and output, based on the outputs from the comparator output terminal and from the second comparator output terminal, update messages comprising consolidations of the first, second, and third prices for the first instrument.

4. The network appliance of claim 3, further comprising:
a memory configured to store configuration parameters for the comparator circuitry, wherein:
  the first comparator input terminal is configured to receive the first price for the first instrument from the first market data feed based on the configuration parameters stored in the memory; and
  the second comparator input terminal is configured to receive the second price for the first instrument from second market data feed based on the configuration parameters stored in the memory.

5. The network appliance of claim 4, wherein:
the memory is further configured to receive an update to the configuration parameters and store updated configuration parameters; and
the second comparator input terminal is further configured to receive a fourth price for the first instrument from a fourth market data feed of the plurality of market data feeds based on the updated configuration parameters.

6. The network appliance of claim 1, further comprising lookup circuitry configured to receive first market data for the first instrument from the first market data feed comprising the first price and the first quantity, map the first market data to the first instrument, and provide the first price to the first comparator input terminal.

7. The network appliance of claim 1, wherein the plurality of digital logic gates is further configured to:
receive first market data for the first instrument from the first market data feed comprising the first price and the first quantity;

receive second market data for the first instrument from the second market data feed comprising the second price and the second quantity;

obtain a first subset of the first market data having at least a first predetermined aggregate quantity, the first subset comprising the first price and the first quantity; and obtain a second subset of the second market data having at least a second predetermined aggregate quantity, the second subset comprising the second price and the second quantity, wherein the comparator circuitry and the multiplexing circuitry are configured to receive the first subset and the second subset and consolidate the first price and the first quantity with the second price and the second quantity from among the first subset and the second subset.

8. The network appliance of claim 7, wherein the plurality of digital logic gates further comprises second comparator circuitry configured to:

receive the first market data for the first instrument from the first market data feed; and compare an aggregated quantity of the first instrument, generated based on the first market data, to the first predetermined aggregate quantity to generate the first subset.

9. The network appliance of claim 1, wherein the FPGA and/or ASIC comprises:

a first FPGA and/or ASIC comprising a first portion of the plurality of digital logic gates configured to receive first market data for the first instrument from the first market data feed comprising the first price and the first quantity and output a first subset of the first market data having at least a first predetermined aggregate quantity and including the first price and the first quantity;

a second FPGA or ASIC comprising a second portion of the plurality of digital logic gates configured to receive second market data for the first instrument from the second market data feed comprising the second price and the second quantity and output a second subset of the second market data having at least a second predetermined aggregate quantity and including the second price and the second quantity; and a third FPGA and/or ASIC comprising a third portion of the plurality of digital logic gates comprising the comparator circuitry and the multiplexing circuitry, wherein:

the first comparator input terminal is configured to receive the first price among the first subset from the first FPGA and/or ASIC;

the second comparator input terminal is configured to receive the second price among the second subset from the second FPGA and/or ASIC;

the first multiplexer input terminal is configured to receive the first quantity among the first subset from the first FPGA and/or ASIC; and the second multiplexer input terminal is configured to receive the second quantity among the second subset from the second FPGA and/or ASIC.

10. The network appliance of claim 9, wherein:

the first subset comprises the first price and/or quantity of the first instrument; and the second subset comprises the second price and/or quantity of the first instrument.

11. The network appliance of claim 9, wherein the first FPGA and/or ASIC comprises a first comparator circuit configured to:

receive the first market data for the first instrument from the first market data feed; and compare an aggregated quantity of the first instrument, generated based on the first market data and including the first quantity, to the first predetermined aggregate quantity to generate the first subset.

12. The network appliance of claim 11, wherein the first FPGA and/or ASIC further comprises a memory configured to store a plurality of sorted price levels of the first market data with aggregated quantities of each price level, and wherein the first comparator circuit comprises a plurality of comparators each configured to compare an aggregate quantity of a respective one of the plurality of sorted price levels to the first predetermined aggregate quantity.

13. The network appliance of claim 12, wherein the first portion of the plurality of digital logic gates is further configured to calculate the aggregate quantity of each of the plurality of sorted price levels as a sum of either:

a quantity of the sorted level combined with quantities of each sorted level having a higher price than the sorted level; or a quantity of the sorted level combined with quantities of each sorted level having a lower price than the sorted level.

14. The network appliance of claim 9, wherein the comparator circuitry comprises a first comparator tree comprising a plurality of comparators, each of the plurality of comparators being configured to receive price data for the first instrument from the plurality of market data feeds.

15. The network appliance of claim 9, wherein:

the comparator circuitry further comprises:

a third comparator input terminal configured to receive the second price from the second market data feed;

a fourth comparator input terminal configured to receive a third price for the first instrument from a third market data feed of the plurality of market data feeds; and a second comparator output terminal configured to provide an output indicating a comparison result of the second price with respect to the third price; and the third portion of the plurality of digital logic gates further comprises an output circuit configured to generate and output, based on the outputs from the comparator output terminal and from the second comparator output terminal, update messages comprising consolidations of the first, second, and third prices for the first instrument.

16. The network appliance of claim 15, wherein:

the third FPGA and/or ASIC further comprises a memory configured to store configuration parameters for the comparator circuitry;

the first comparator input terminal is configured to receive the first price based on the configuration parameters stored in the memory; and the second comparator input terminal is configured to receive the second price based on the configuration parameters stored in the memory.

17. The network appliance of claim 13, wherein the third FPGA and/or ASIC further comprises lookup circuitry configured to receive the first and second subsets, map the first and second subsets to the first instrument, and provide the first price to the first comparator input terminal and the second price to the second comparator input terminal.

18. A network appliance, comprising:
a field programmable gate array (FPGA) and/or application specific integrated circuit (ASIC) comprising a plurality of digital logic gates arranged to form at least:
- a comparator circuit, comprising:
  - a first comparator input terminal configured to receive a first value;
  - a second comparator input terminal configured to receive a second value in parallel with the first comparator input terminal receiving the first value; and
  - a comparator output terminal configured to, in response to the first comparator input terminal and the second comparator input terminal receiving the first value and the second value in parallel, respectively, provide an output indicating a comparison result of the first value at the first comparator input terminal with respect to the second value at the second comparator input terminal; and
- a multiplexing circuit, comprising:
  - a first multiplexer input terminal configured to receive a third value;
  - a second multiplexer input terminal configured to receive a fourth value in parallel with the first multiplexer input terminal receiving the third value; and
  - a multiplexer output terminal configured to, in response to the first multiplexer input terminal and the second multiplexer input terminal receiving the third value and the fourth value in parallel, respectively, provide an output from among at least the third value at the first multiplexer input terminal and the fourth value at the second multiplexer input terminal,
  wherein the comparator output terminal is coupled to a terminal of the multiplexing circuit such that the output from the multiplexer output terminal is based, at least in part, on the comparison result indicated by the output of the comparator circuit,
wherein the plurality of digital logic gates are configured to;
  receive data for a first instrument from a plurality of source data feeds;
  provide the data in parallel to at least the first comparator input terminal and the second comparator input terminal of the comparator circuit and in parallel at least to the first multiplexer input terminal and the second multiplexer input terminal of the multiplexing circuit; and
  output, at least from the comparator output terminal of the comparator circuit in response to the data provided in parallel to the first comparator input terminal and the second comparator input terminal and from the multiplexer output terminal of the multiplexing circuit in response to the data provided in parallel to the first multiplexer input terminal and the second multiplexer input terminal, consolidated data for the first instrument across the plurality of source data feeds.

19. The network appliance of claim 18, wherein the comparator output terminal is coupled to a selection terminal of the multiplexing circuit.

* * * * *